(No Model.) 2 Sheets—Sheet 1.

J. W. BARBEAU.
MACHINE FOR BEATING BRAN.

No. 266,599. Patented Oct. 31, 1882.

WITNESSES
INVENTOR
Joseph Wallace Barbeau (No Model.) 2 Sheets—Sheet 2.

J. W. BARBEAU.
MACHINE FOR BEATING BRAN.

No. 266,599. Patented Oct. 31, 1882.

WITNESSES
INVENTOR
Joseph Wallace Barbeau

UNITED STATES PATENT OFFICE.

JOSEPH W. BARBEAU, OF NEW ORLEANS, LOUISIANA.

MACHINE FOR BEATING BRAN.

SPECIFICATION forming part of Letters Patent No. 266,599, dated October 31, 1882.

Application filed March 15, 1881. (No model.)

*To all whom it may concern:*

Be it known that I, JOSEPH WALLACE BARBEAU, a citizen of the United States, residing at New Orleans, in the parish of Orleans, State of Louisiana, have invented a new and useful Improvement in Machines for Beating Bran, of which the following is a specification.

The object of my invention is to produce a machine that shall effectually clean bran of the particles of middlings and flour adhering to it by passing it through a single or double set of rollers which have teeth on them in alternate vertical rows. As the rollers revolve the bran passes through between the intercurrent-teeth and the finer particles are knocked off. The bran and finer particles are discharged below the machine and conveyed to a bolter, where the separation is finally effected.

Figure 1:
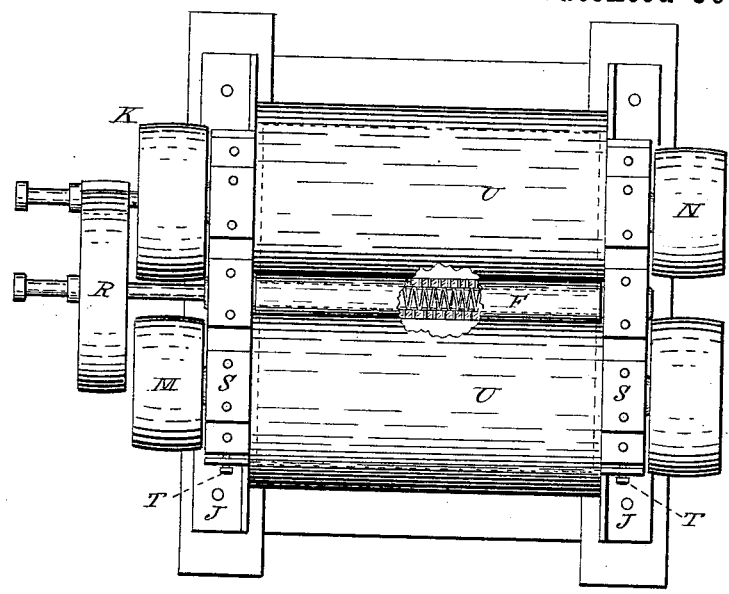
Figure 2:
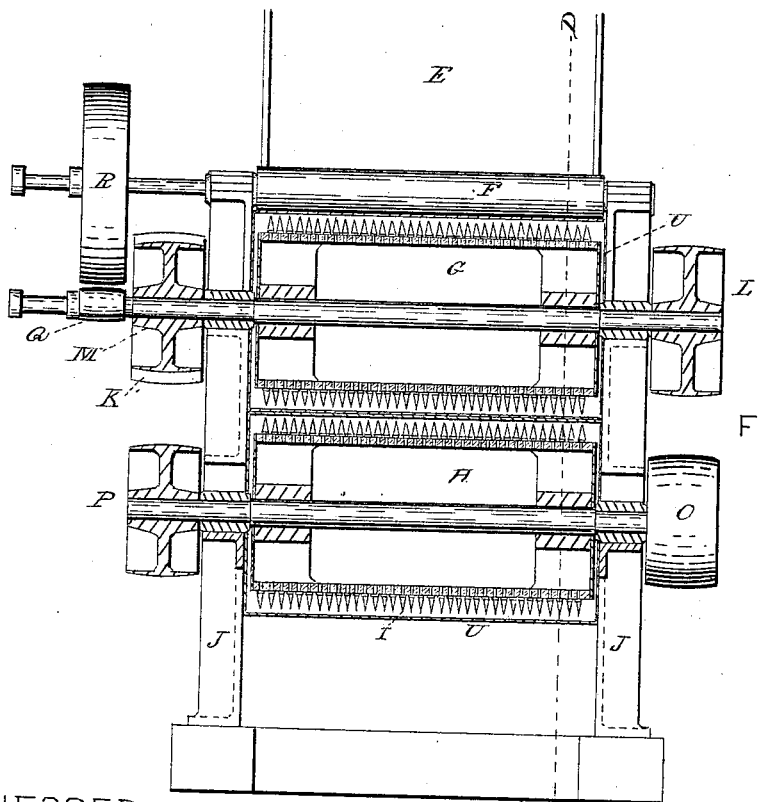
Figures 3, 4:
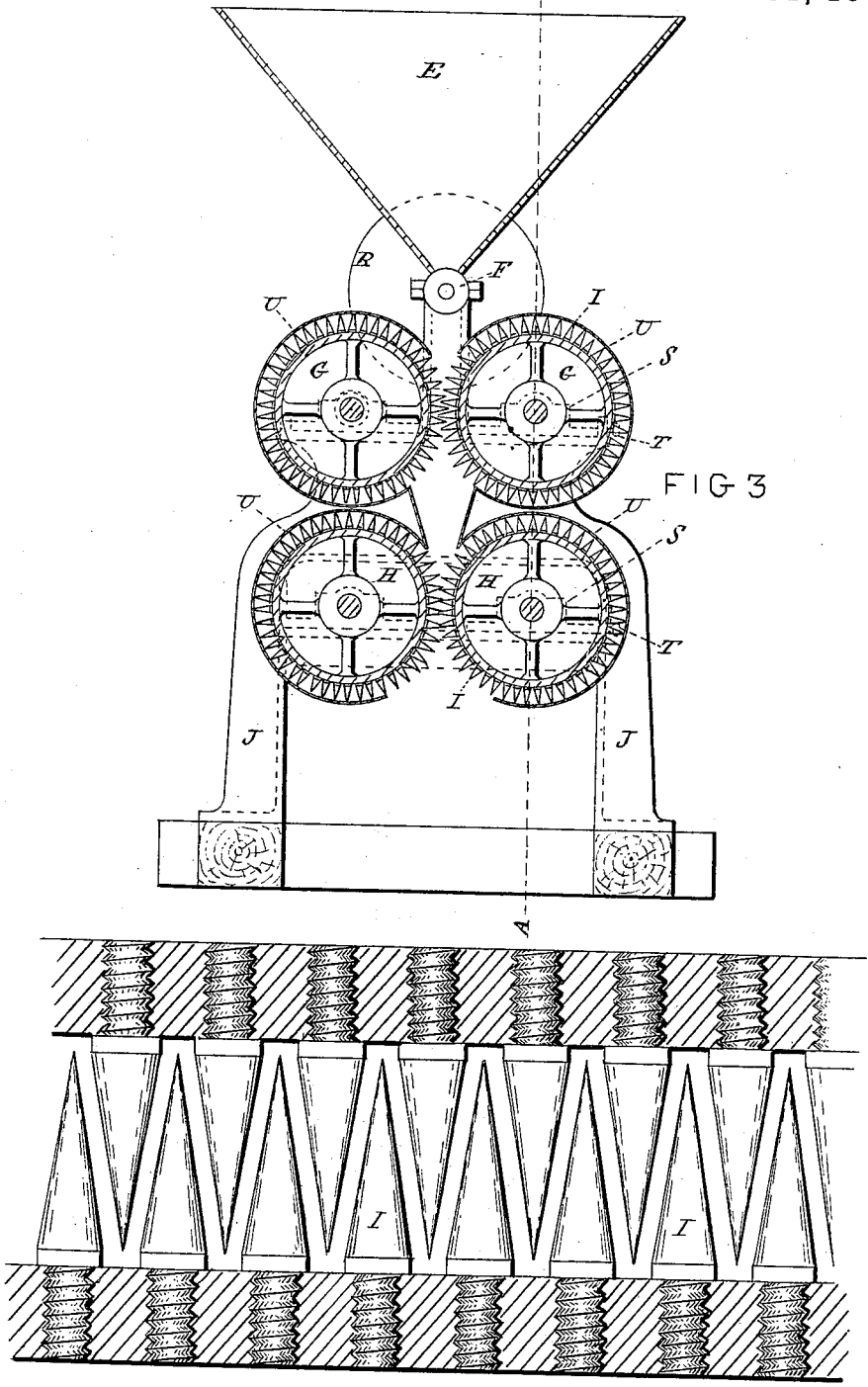

Figure 1 is a ground plan of top of machine with hopper removed, and shows a portion of case broken away, exposing teeth in rollers and section of shells. Fig. 2 is a vertical section of machine through line A B with one side of hopper removed. Fig. 3 is a section of machine through line C D of Fig. 2. Fig. 4 is a longitudinal section, full size, of a portion of the shells of the two upper or two lower rollers, and showing the intercurrent teeth and spaces between which the bran passes.

The bran is fed into the hopper E and the feed to machine regulated by a slide in one side of the hopper the whole length of the feed-roller F. By drawing out or shutting in the slide the space is increased or diminished between roller F and the end of the slide, so the amount of bran passing through by the revolution of the roller F is regulated at will. The two upper rollers, G, and two lower rollers, H, revolve inwardly, and are provided with rows of teeth or pins I, as shown, the teeth in each row following one another around the circle of rollers, and a space is left between rows to allow the teeth of the next roller in horizontal frame to intercur, leaving a space of about an eighth of an inch between sides of the teeth, as shown at Fig. 4. These rollers revolve about three hundred revolutions per minute, and the bran, passing through between the teeth, is violently knocked and beaten, so that the finer particles adhering to it are loosened and knocked off. The bran falls and again passes through the lower rollers, H, undergoing a similar repeated process. The bran and loosened fine particles of middlings and flour then are conveyed to a bolting-machine, where they are finally separated.

J are stands to hold the rollers G H K.

L are driving-pulleys, which are driven from shafting overhead pulleys by a straight belt to one and a cross-belt to the other, so that the rollers G may both revolve inwardly.

The lower rollers, H, receive their motion from pulleys M N by straight belts onto pulleys O P, so that rollers H H also revolve inwardly. The feed-roller F is driven by pulley Q, belting onto pulley R. Thus in the entire machine cog-gearing is dispensed with. One of the rollers of each set is arranged with bearings S, that slide, graduated by set-screws T, so as to adjust the degree of beating the bran shall receive by withdrawing the teeth I more or less.

The rollers G and H are incased in an iron shell, U, the teeth I having a suitable clearance. The rollers may be arranged to have equal speeds per minute; or one of the rollers of each pair may make a less number of revolutions than its fellow, so the bran may be more thoroughly beaten by striking against the slow-moving pins by the action of the faster-moving pins of its fellow-roller and creating some attrition.

What I claim, and desire to secure by Letters Patent, is—

1. In a machine for beating bran, the combination of rollers G and G, said rollers being adapted to revolve rapidly, and provided with conical or tapering pins or teeth in circumferential row, the teeth of the one roller being arranged to be intercurrent with the teeth of the other and to leave a clearance through which the bran may pass and be beaten, substantially as described.

2. An organized bran-duster consisting essentially of a hopper, a feed-roller, and a pair or set of revolving rollers provided with intercurrent conical or tapering teeth, substantially as set forth.

JOSEPH WALLACE BARBEAU.

Witnesses:
FREDERIC COOK,
F. D. SEGHERS.